(12) United States Patent
Brubaker

(10) Patent No.: US 10,293,750 B2
(45) Date of Patent: May 21, 2019

(54) DIGITAL DISPLAY SYSTEM WITH A FRONT-FACING CAMERA AND REAR DIGITAL DISPLAY

(71) Applicant: BCAT LLC, Monarch Bay, CA (US)

(72) Inventor: Curtis M. Brubaker, Monarch Beach, CA (US)

(73) Assignee: BCAT, LLC, Dana Point, CA (US)

( * ) Notice: Subject to any disclaimer, the term of this patent is extended or adjusted under 35 U.S.C. 154(b) by 0 days.

(21) Appl. No.: 15/848,414

(22) Filed: Dec. 20, 2017

(65) Prior Publication Data

US 2018/0304810 A1    Oct. 25, 2018

Related U.S. Application Data

(63) Continuation of application No. 14/663,352, filed on Mar. 19, 2015, now Pat. No. 9,878,666.

(60) Provisional application No. 61/955,647, filed on Mar. 19, 2014.

(51) Int. Cl.
*B60R 1/00* (2006.01)
*H04N 7/18* (2006.01)

(52) U.S. Cl.
CPC .......... *B60R 1/00* (2013.01); *B60R 2300/202* (2013.01); *B60R 2300/406* (2013.01); *B60R 2300/8093* (2013.01); *H04N 7/181* (2013.01)

(58) Field of Classification Search
CPC ............... B60R 1/00; B60R 2300/202; B60R 2300/8093
USPC ....................................................... 348/148
See application file for complete search history.

(56) References Cited

U.S. PATENT DOCUMENTS

| D246,772 | S | 12/1977 | Brubaker |
|---|---|---|---|
| D246,775 | S | 12/1977 | Brubaker |
| 4,080,922 | A | 3/1978 | Brubaker |
| 5,150,116 | A | 9/1992 | West |
| 5,481,257 | A | 1/1996 | Brubaker et al. |
| 6,150,930 | A | 11/2000 | Cooper |

(Continued)

FOREIGN PATENT DOCUMENTS

| CN | 1325100 | 12/2001 |
|---|---|---|
| CN | 2573322 | 9/2003 |

(Continued)

OTHER PUBLICATIONS

U.S. Appl. No. 13/847,925, filed Mar. 20, 2013.

(Continued)

*Primary Examiner* — Jeffery A Williams
(74) *Attorney, Agent, or Firm* — Knobbe, Martens, Olson & Bear, LLP

(57) ABSTRACT

There is provided a digital display system for use with a first vehicle. The first vehicle includes a vehicle body, a vehicle front end and a vehicle rear end. The system includes a front-facing camera affixed with the vehicle body configured to capture digital images from in front of the vehicle front end. The system further includes a wireless receiver affixed with the vehicle body configured to receive an activation request signal from a wireless transmitter of a second vehicle. The system further includes a digital display affixed with the vehicle body disposed at the vehicle rear end. The digital display is configured to display captured digital images from the front-facing camera in response to receipt of an activation request signal by the wireless receiver.

20 Claims, 3 Drawing Sheets

(56) References Cited

U.S. PATENT DOCUMENTS

| | | |
|---|---|---|
| 6,484,148 B1 | 11/2002 | Boyd |
| 6,545,596 B1 | 4/2003 | Moon |
| 7,659,808 B1 | 2/2010 | Cooper et al. |
| 9,183,572 B2 | 11/2015 | Brubaker |
| 9,299,077 B2 | 3/2016 | Brubaker |
| 9,878,666 B2 | 1/2018 | Brubaker |
| 2001/0013016 A1 | 8/2001 | Hunter |
| 2002/0009978 A1 | 1/2002 | Dukach et al. |
| 2002/0135515 A1 | 9/2002 | Rankin et al. |
| 2002/0164962 A1 | 11/2002 | Mankins et al. |
| 2002/0167416 A1 | 11/2002 | Polyakov |
| 2003/0006911 A1 | 1/2003 | Smith et al. |
| 2003/0050744 A1 | 3/2003 | Saraiva |
| 2003/0195670 A1 | 10/2003 | Smith et al. |
| 2004/0008157 A1 | 1/2004 | Brubaker et al. |
| 2004/0036622 A1 | 2/2004 | Dukach et al. |
| 2004/0226204 A1 | 11/2004 | Green |
| 2005/0024189 A1 | 2/2005 | Weber |
| 2005/0091890 A1 | 5/2005 | Snyder |
| 2005/0231385 A1 | 10/2005 | Haase |
| 2007/0079331 A1 | 4/2007 | Datta et al. |
| 2007/0112762 A1 | 5/2007 | Brubaker |
| 2007/0115138 A1 | 5/2007 | Arakawa |
| 2007/0132664 A1 | 6/2007 | Weissman |
| 2008/0068455 A1 | 3/2008 | Pratt |
| 2008/0231067 A1 | 9/2008 | Nagle |
| 2009/0299857 A1 | 12/2009 | Brubaker |
| 2011/0295697 A1 | 12/2011 | Boston et al. |
| 2012/0044429 A1 | 2/2012 | Guerra |
| 2013/0231828 A1 | 9/2013 | Seal |
| 2013/0265414 A1 | 10/2013 | Yoon |
| 2014/0078407 A1 | 3/2014 | Green |
| 2014/0247160 A1* | 9/2014 | Glascock ............... G08G 1/095 340/907 |
| 2015/0194082 A1 | 7/2015 | McEwan |
| 2015/0282346 A1 | 10/2015 | Ganim et al. |
| 2016/0140614 A1 | 5/2016 | Brubaker |
| 2017/0200197 A1 | 7/2017 | Brubaker |

FOREIGN PATENT DOCUMENTS

| | | |
|---|---|---|
| JP | 02-093147 | 7/1990 |
| JP | 03-290689 | 12/1991 |
| JP | 3020426 U | 1/1996 |
| JP | 10-207413 | 8/1998 |
| JP | 11-065434 | 3/1999 |
| JP | 2000-071895 | 3/2000 |
| JP | 2002-006293 | 1/2002 |
| JP | 2003-125379 | 4/2003 |
| JP | 2003-131604 | 5/2003 |
| JP | 2003-186777 | 7/2003 |
| JP | 2003-252153 | 9/2003 |
| JP | 2004-029572 | 1/2004 |
| JP | 2004-070181 | 3/2004 |
| JP | 2004-072475 | 3/2004 |
| JP | 2004-271738 | 9/2004 |
| JP | 2004-272007 | 9/2004 |
| JP | 2004-279509 | 10/2004 |
| JP | 2005-164858 | 6/2005 |
| JP | 2005-173836 | 6/2005 |
| JP | 2006-285225 | 10/2006 |
| JP | 2007-526165 | 9/2007 |
| KR | 10-2000-0062502 | 10/2000 |
| KR | 10-2001-0081864 | 8/2001 |
| KR | 10-2002-0025393 | 4/2002 |
| KR | 10-2005-0008281 | 1/2005 |
| KR | 10-2005-0043353 | 5/2005 |
| KR | 10-2005-0072369 | 7/2005 |
| RU | 145277 | 9/2014 |
| WO | WO 2006/136847 | 12/2006 |
| WO | WO 2007/109541 | 9/2007 |
| WO | WO 2008/019105 | 2/2008 |
| WO | WO 2016/014966 | 1/2016 |
| WO | WO 2017/180900 | 10/2017 |

OTHER PUBLICATIONS

U.S. Appl. No. 13/860,891, filed Apr. 11, 2013.
U.S. Appl. No. 61/613,898, filed Mar. 21, 2012.
Evans, Scott, "German Firm EDAG Previews 'Light Car' Concept Ahead of Geneva Debut", published Jan. 20, 2009, pp. 3.
Felton, Ryan, "The Fully-Autonomous Electric Smart ForTwo Concept Car Has a Grille That Will Greet You With 'Hey'", https://web.archive.org/web/20170913205308/http://jalopnik.com/the-fully-autonomous-electric-smart-fortwo-concept-car-1798631981, Aug. 30, 2017, pp. 5.
Orlove, Raphael, "The Secrets of the Rig That Can Transform Into Any Car", http://jalopnik.com/the-secrets-of-the-righ-that-can-transform-into-any-car-1786339083, published Sep. 7, 2016, pp. 5.
Paukert, Chris, "Geneva 2009: Clever EDAG "Light Car Open-Source" is like safety television for tailgaters", http://www.autoblog.com/2009/03/03/geneva-2009-clever-edag-light-car-open-source-is-like-safety/, published Mar. 3, 2009, pp. 2.
Reid, Rory, "Light Car—Open Source: Bringing OLED TVs to the Streets", http://www.cnet.com/roadshow/pictures/light-car-open-source-bringing-oled-tvs-to-the-streets/, published Mar. 4, 2009, pp. 7.
Torchinsky, Jason, "The Mercedes-Benz Concept EQA Shows How Mercedes Can Phone in an Electric Hatch With a TV for a Grille", https://web.archive.org/web/20170913210224/http://jalopnik.com/the-mercedes-benz-concept-eqa-shows-how-mercedes-can-ph-1803775986, Sep. 12, 2017, pp. 5.
Official Communication received in Chinese Patent Application No. 200780017509.5 dated Mar. 1, 2012 in 3 pages.
Official Communication received in Chinese Patent Application No. 201310310267.6 dated Dec. 15, 2015 in 12 pages.
Official Communication received in Chinese Patent Application No. 201310310267.6 dated Oct. 31, 2016 in 3 pages.
Official Communication received in European Patent Application No. 07758697.2 dated Apr. 25, 2014 in 4 pages.
Official Communication received in European Patent Application No. 07758697.2 dated Apr. 13, 2017 in 4 pages.
Official Communication received in Indian Patent Application No. 8686/DELNP/2008 dated Jun. 24, 2016 in 8 pages.
Official Communication received in Japanese Patent Application No. 2009-500627 dated Apr. 2, 2013 in 5 pages.
Official Communication received in Japanese Patent Application No. 2009-500627 dated Oct. 28, 2014 in 7 pages.
Official Communication received in Japanese Patent Application No. 2013-207242 dated Oct. 7, 2014 in 4 pages.
Official Communication received in Japanese Patent Application No. 2013-207242 dated Sep. 6, 2016 in 10 pages.
Official Communication received in Japanese Patent Application No. 2015-214596 dated Jan. 10, 2017 in 4 pages.
Official Communication received in Korean Patent Application No. 10-2008-7025185 dated May 25, 2012 in 5 pages.
Official Communication received in Korean Patent Application No. 10-2008-7025185 dated Dec. 28, 2012 in 5 pages.
Official Communication received in Korean Patent Application No. 10-2008-7025185 dated Nov. 26, 2013 in 4 pages.
Official Communication received in Korean Patent Application No. 10-2008-7025185 dated Jun. 3, 2014 in 6 pages.
Official Communication received in Korean Patent Application No. 10-2008-7025185 dated Apr. 29, 2015 in 2 pages.
Official Communication received in Korean Patent Application No. 10-2013-7017232 dated Dec. 22, 2014 in 2 pages.
Official Communication received in Korean Patent Application No. 10-2014-7033391 dated May 21, 2015 in 3 pages.
Official Communication received in Korean Patent Application No. 10-2014-7033391 dated Mar. 30, 2016 in 6 pages.
Official Communication received in Korean Patent Application No. 10-2017-7006678 dated Jul. 3, 2017 in 4 pages.
International Search Report and Written Opinion received in PCT Application No. PCT/US2007/064175 dated Oct. 12, 2007 in 8 pages.
International Preliminary Report on Patentability and Written Opinion received in PCT Application No. PCT/US2007/064175 dated Sep. 16, 2008 in 8 pages.

(56) References Cited

OTHER PUBLICATIONS

International Search Report and Written Opinion received in PCT Application No. PCT/US2015/042040 dated Apr. 22, 2016 in 13 pages.
International Preliminary Report on Patentability and Written Opinion received in PCT Application No. PCT/US2015/042040 dated Feb. 2, 2017 in 10 pages.
International Search Report and Written Opinion received in PCT Application No. PCT/US2017/027464 dated Aug. 17, 2017 in 6 pages.
Official Communication received in Japanese Patent Application No. 2015-214596 dated Nov. 28, 2017 in 3 pages.
Official Communication received in Japanese Patent Application No. 2015-214596 dated Jun. 5, 2018 in 4 pages.
Official Communication received in Korean Patent Application No. 10-2017-7006678 dated May 28, 2018 in 5 pages.

* cited by examiner

DIGITAL DISPLAY SYSTEM WITH A FRONT-FACING CAMERA AND REAR DIGITAL DISPLAY

CROSS-REFERENCE TO RELATED

The present application is a continuation of U.S. application Ser. No. 14/663,352, filed Mar. 19, 2015, titled DIGITAL DISPLAY SYSTEM WITH A FRONT-FACING CAMERA AND REAR DIGITAL DISPLAY, which claims the benefit of U.S. Provisional Application No. 61/955,647, titled BLIND SPOT SEE-THROUGH TRANSPARENSY (Digital Windows) filed Mar. 19, 2014; the above-cited applications are hereby incorporated by reference in their entireties.

BACKGROUND OF THE INVENTION

Field of the Invention

The present invention relates generally to digital display systems used with vehicles, and more particularly a digital display system including a front-facing camera and rear digital display.

Description of the Related Art

The safe operation of motor vehicles is of primary importance. In particular, vehicles create visual obstructions for other trailing or following vehicles and thereby create a potentially dangerous environment to drive in. This is particularly the case where a view obstructing vehicle is large, such as a bus or truck.

There are existing prior art systems that seek to address such safety concerns that make use of video cameras and networked vehicles. In one such prior art system, forward-looking cameras are mounted on or near the windshields of large or long vehicles. These cameras then stream live video images of the road ahead, wirelessly to a receiver in an appropriately-equipped trailing or following vehicle. The trailing/following vehicle may then process the live video images for presentation on a transparent LCD display which is integrated into the trailing/following vehicle's windshield.

In another prior art system, a two video camera arrangement is required—one on the leading/view-blocking vehicle, and a second camera on any (and all) vehicles wising to use the "see-through" system. This system is a range-sensitive system which requires users to be relatively close behind the leading/view-blocking vehicle. At a predetermined distance, imagery from both the forward vehicle's camera and the rear vehicle's camera is blended using a special algorithm for display on a Heads-Up Display (HUD) in the following vehicle's windshield. Here, pixels from the leading vehicle's camera replace pixels from the rear vehicle's camera to create an illusion that the leading/view-blocking vehicle appears to become transparent.

The visual technique has some effectiveness but it only functions when the vehicles are within a certain range of each other. Additionally, there are dangers that the processed image presented on the following vehicle's windshield HUD makes the true image of the leading vehicle almost entirely vanish. Such a lack of visual definition could cause a misreading (especially during actual driving, lighting or weather conditions), and perhaps cause accidents.

The above prior art systems have potentially other serious drawbacks or limitations. One such drawback is transmission latency. Because the image is transmitted wirelessly from a leading vehicle to a following vehicle where it is then processed and displayed on the inside of the following vehicle's windshield, there is a delay in the presented image relative to the real world condition. This may be enough to make an oncoming vehicle (such as in a passing lane) appear further away than it actually is. Such latency can cause a head-on vehicle accident or a dangerous situation with pedestrians.

View alignment is another drawback. The viewing vehicle driver must keep his/her eyes (and therefor point of view) within specific physical parameters to assure that the superimposed images on the LCD display remains properly aligned with his/her true rear-end view of the leading vehicle. This activity may require much effort on the part of the following vehicle driver. Failure to have the proper alignment or vehicle relative movement can result in image shifts causing significant undesirable and distractive feedback.

Moreover, depth of field is another drawback. A driver preparing to pass must focus his/her eyes on the vehicle to be passed, the surrounding environment, and additionally on the much closer shifting image frame on the LCD display which is attached to his/her windshield. This represents an uncomfortable adjustment in focus and depth of field at a time clear viewing, sound judgment and rapid decision-making are critical.

The prior art systems may position a thick black, snap-adjust reference frame on the viewing LCD to define the area in which the video image appears and changes. As the two vehicles move relative to one another in three dimensions, the black frame snap-adjusts to its revised position and the mere presence of such movement with its associated blockage of the driver's true view can be both distractive and dangerous.

The prior art systems demand that any and all vehicles using the systems be fitted with either cameras and transmitters (the leading/presenting vehicles), or with receivers, processors and a transparent LCD windshield video Heads-Up Display (HUD) in order to work.

Another drawback of the prior art is related to tampering/hacking of transmitted images and/or interference. Because the prior art requires V2V Dedicated Short Range Communication (DSRC) between involved vehicles, the system is subject to wireless interference, dropouts, jamming or deliberate hacking (in addition to latency). It is also conceivable that images from a camera on yet a second or third transmitting vehicle could be inadvertently received—or received by multiple vehicles within range, including vehicles which may be traveling in opposite directions. Such issues could have serious unintended consequences.

Therefore, there is a need in the art for an improved display system in comparison to the prior art. Various aspects of the present invention address these particular needs, as will be discussed in more detail below.

BRIEF SUMMARY

In accordance with an aspect of the present invention, there is provided a digital display system for use with a first vehicle. The first vehicle includes a vehicle body, a vehicle front end and a vehicle rear end. The system includes a front-facing camera affixed with the vehicle body configured to capture digital images from in front of the vehicle front end. The system further includes a wireless receiver affixed with the vehicle body configured to receive an activation request signal from a wireless transmitter of a second vehicle. The system further includes a digital display affixed with the vehicle body disposed at the vehicle rear end. The digital display is configured to display captured digital images from the front-facing camera in response to receipt of an activation request signal by the wireless receiver.

According to various embodiments, the front-facing camera may be disposed at the vehicle front end. The front-facing camera may be configured to capture video images. The activation request signal may be a radio frequency signal. The digital display system may further include a distance sensor disposed at the vehicle rear end. The distance sensor is configured to sense distance data of an object behind the vehicle rear end, and the digital display is configured to display captured digital images from the front-facing camera in response to receipt of sensed distance data from the distance sensor. The digital display system may further include an image processor. The image processor is configured to scale the captured digital images prior to display at the digital display.

In accordance with another aspect of the present invention, there is provided a method of displaying images upon a first vehicle. The first vehicle includes a vehicle body, a vehicle front end and a vehicle rear end. The method includes capturing digital images from in front of the vehicle front end by a front-facing camera of the first vehicle. The method further includes receiving an activation request signal from a wireless transmitter of a second vehicle by a wireless receiver of the first vehicle. The method further includes displaying the captured digital images at the vehicle rear end in response to receipt of the activation request signal.

According to various embodiments, the front-facing camera may be configured to capture video images. The activation signal may be a radio frequency signal. The method may further include sensing with a distance sensor disposed at the vehicle rear end distance data of the second vehicle behind the vehicle rear end. The digital display may be configured to display captured digital images from the front-facing camera in response to the sensed distance data. The method may further include determining proximity data of the second vehicle to the first vehicle based upon the received activation request signal. The digital display may be configured to display captured digital images from the front-facing camera in response to the determined proximity data. The method may further include scaling captured digital images prior to display at the digital display. The method may further include receiving a signal indicating activation of the turn signal indicator from the wireless transmitter of a second vehicle by the wireless receiver of the first vehicle. The method may further include determining a movement status of the first vehicle, and displaying the captured digital images at the vehicle rear end using the determined movement status of the first vehicle.

According to another aspect of the present invention, there is provided a method of viewing digital images upon a first vehicle. The first vehicle has a vehicle front end and a vehicle rear end. The method includes activating a turn signal indicator at a second vehicle. The method further includes transmitting an activation request signal from a wireless transmitter of the second vehicle to a wireless receiver of the first vehicle. The method further includes viewing displayed digital images at the vehicle rear end of captured digital images from in front of the vehicle front end in response to the activation request signal. The method of viewing may further include transmitting a signal indicating activation of the turn signal indicator from the wireless transmitter of the second vehicle to the wireless receiver of the first vehicle.

According to yet another aspect of the present invention, there is provided a digital display system for use with a first object. The first object includes an object first side and an object second side. The system includes a camera configured to capture digital images from adjacent the object first side. The system further includes a wireless receiver configured to receive an activation request signal from a wireless transmitter of a second object. The method further includes a digital display disposed at the object second side. The digital display is configured to display captured digital images from the camera in response to receipt of an activation request signal by the wireless receiver. The first object may be a vehicle. In another embodiment, the first object may be a fixed structure. The second object may be a mobile object, such as a vehicle or a mobile device.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and detailed description to indicate like elements.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
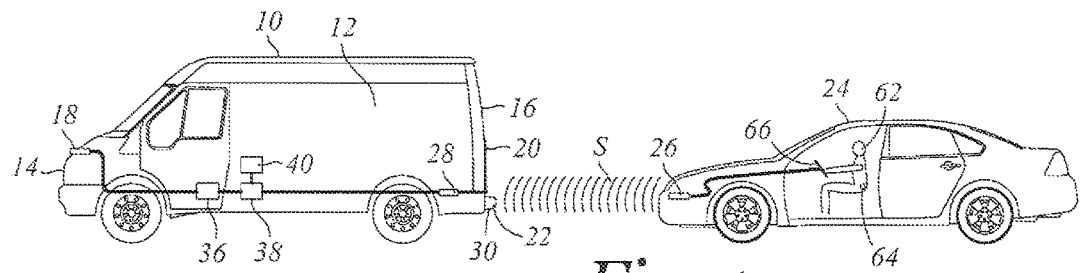
FIG. 1 is a side view of a symbolic schematic diagram of a first vehicle equipped with a digital display system according to an aspect of the present invention along with a second vehicle.

Referring now to the drawings, wherein the showings are for purposes of illustrating preferred embodiments of the present invention only, and are not for purposes of limiting the same, FIG. 1 is a side view of a symbolic schematic diagram of a first vehicle 10 equipped with a digital display system according to an aspect of the present invention along with a second vehicle 24.

In accordance with an aspect of the present invention, there is provided a digital display system for use with the first vehicle 10. The first vehicle 10 including a vehicle body 12, a vehicle front end 14 and a vehicle rear end 16. The system includes a front-facing camera 18 affixed with the vehicle body 12 configured to capture digital images from in front of the vehicle front end 14. The system further includes a wireless receiver 22 affixed with the vehicle body 12 configured to receive an activation request signal "S" from a wireless transmitter 26 of a second vehicle 24. The system further includes a digital display 20 affixed with the vehicle body 12 disposed at the vehicle rear end 16. The digital display 20 is configured to display captured digital images from the front-facing camera 18 in response to receipt of an activation request signal "S" by the wireless receiver 26.

It is contemplated that the display system provides a form of see-through digital transparency to eliminate blind spots caused by motor vehicles or fixed objects near roadside while driving, or passing on open or winding roads or negotiating traffic intersections. The invention captures live digital video images from one side of an obstructing object and streams it in real time to a display(s) on the opposing 'blind' side creating a window-like opening through any vision blocking structure.

Figure 5A:
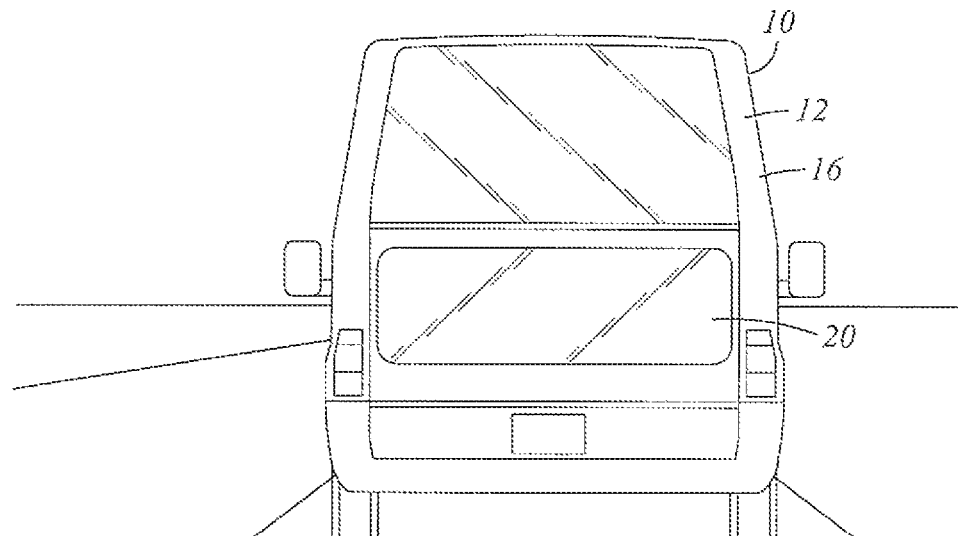
FIG. 5a is a rear view of the first vehicle of FIG. 1 with the digital display not activated.
Figure 5B:
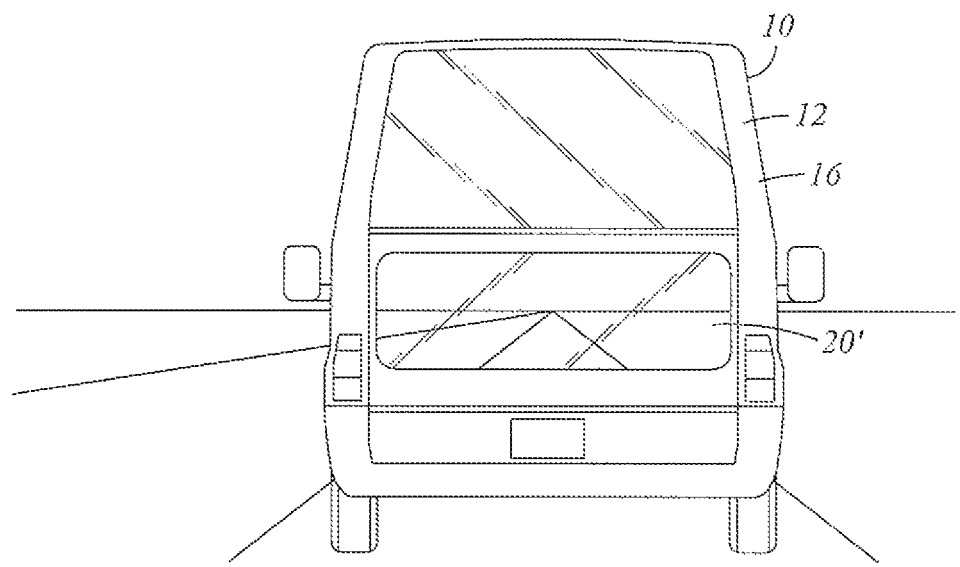
FIG. 5b is a rear view of the first vehicle of FIG. 1 with the digital display activated.

In the context of the first and the second vehicles, 1-, 24, the first vehicle 10 is a leading and obstructing vehicle to the following or trailing vehicle 24. The display of captured digital images on the digital display 20 creates a "digital window" from the perspective of the second vehicle 24. Referring now to FIG. 5*a*, there is a rear view of the first vehicle 10 of FIG. 1 with the digital display 20 not activated. FIG. 5*a* is a rear view of the first vehicle 10 of FIG. 1 with the digital display 20' activated. From the point of view of the second vehicle 24, the activated digital display 20' is effectively a "digital window" as the viewer can see images from the front of the first vehicle 10. The view of the surroundings immediately in front of the first vehicle 10 would otherwise be obstructed by the first vehicle 10. This invention seeks to dramatically improve the safety and operation of motor vehicles when they are closely following vehicles preparing to pass—particularly large obstructing vehicles such as trucks or busses on single lanes or winding roads where the need to pass is great but the ability to see around turns, large vehicles or fixed obstructions, or to predict the driving environment blocked by such objects is difficult if not impossible.

The instant invention disclosed herein seeks to improve upon see-through transparency concepts (including the described prior art) by adding an outdoor video display to the rear-facing surface(s) of motor vehicles or the faces of blocking structures using the technology. Such a display eliminates the need for wireless real time transmission to other vehicles or positions as well as the need for complex, expensive LCD windshield-mounted displays. The invention thus places all of the primary functional components onto a single vehicle or into a single offending/blocking object (typically a truck, bus or a roadside architectural obstruction) to enable a more cost-effective, self-contained solution for implementing "blind spot see-through transparency", or what might be called "digital windows." The present invention seeks to expand see-through functionality to all types of moving vehicles, parked vehicles, stalled vehicles, stationary objects, temporary roadside or sidewalk blockages and such common obstructions as new or temporary construction sites with the final objective of enabling clear, real time views of opposing side traffic flow, intersections, blind corners, entries, exits, crosswalks and other areas where a clear unobstructed point-of-view (POV) is critical for driving and traffic safety. This is accomplished by using video cameras to capture real-time imagery of a scene without the visual blockage (for example from the opposite side of such said blockage) then reproducing that scene such as on large scale digital video display surfaces which are attached to, integrated with, or otherwise positioned to replace the obstructed POV with a real-time visually-synchronized digital simulation of the original.

While the display system can be passive in operation—or can be 'always ON' and ready to receive a transmitted activation request signal—it can also be triggered automatically based on specific criteria, or it can be operated manually by a presenting vehicle's operator, or by a viewing vehicle's driver—or if proven safe and lawful, by an occupant of such vehicle.

The display system may electronically create what appears to be a "window" or "opening" on or through any and all surfaces causing undesirable visual blockages essential sight lines. Prime examples are the rear portions of large motor vehicles which one might encounter on open highways or winding roads and wish to pass; or large moving or static blockages to visual sight lines—on, near, adjacent or tangential to street intersections, parking garages, sidewalks, pedestrian corridors or countless points where serious accidents or fender-benders can typically occur. The intent of the present invention then is to enable moving vehicles or static visual blockages to become permanently or temporarily transparent to facilitate safer vehicular or pedestrian passage—much as though the blockage did not exist.

It is contemplated that the display system removes or mitigates issues of image latency, wireless transmission interference, drop-outs and hacking as may be experienced by prior art display systems by using hard-wired connections where possible or internal vehicle-restricted wireless transmissions between front-looking cameras and rear-facing displays. It is contemplated that the display system eliminate a following driver's need to simultaneously focus on multiple depths of fields or multiple surfaces as opposed to a single area or "window" on a single vehicle (a dedicated video display in the form of the digital display 20) within a driver's field of view. This is in contrast to the following driver having a display within his/her own vehicle.

The front-facing camera 18 may be selected from those which are well known to one of ordinary skill in the art. Preferably, the front-facing camera is configured to capture video images, and that the front-facing camera 18 is able to "stream" digital images for display at the digital display 20 as close to real-time as possible. The front-facing camera 18 may use a wide variety of optics to accommodate nearly any desired forward-looking field of view (or wide angle) or visual scenario. In addition, an image processor 36 may be provided. The image processor 36 may be a separate component as symbolic indicated or integrated with the forward-facing camera 18. The image processor 36 may be configured to scale the captured digital images prior to display at the digital display 20. The image processor 36 may be configured to adjust the capture digital images for point-of-view/field of view consideration and scaling (such as for differences between the digital display 20 and the camera 18, and lateral adjustments (such as for an off-set camera location at the far side of a vehicle or obstruction). The processing/scaling can also adjust for a true point-of-view (POV) from a height or viewing position.

Further, it is contemplated that there are many cameras and related processing technologies with options for optimizing imagery for day versus night situations, such as for driving into direct sunlight or for enhancing night driving with night-vision technologies or for reproducing (or not reproducing) such views on the desired video displays. Various digital filters may be used to adjust for such lighting conditions. Additionally, it is contemplated that the front-facing camera 18 may include more than one camera or cameral types. The image processor 36 may be configured to integrate or "stitch" captured digital images or multiple feeds of digital images as the case may be.

As mentioned above, the system includes the front-facing camera 18 affixed with the vehicle body 12. As used herein the term "affixed with" refers to being attached to, mounted or otherwise integrated with. In this regard, the front-facing camera 18 may come pre-installed by the vehicle manufacturer or installed and attached as an after-market device.

The front-facing camera 18 may be disposed at any location about the vehicle 10. For example, the front-facing camera 18 may be located at the vehicle front end 14, such as integrated with a front grill, a bumper, a headlamp unit or a hood. Other locations may include along a front windshield, (such as in a glazing portion), in a front portion of a vehicle roof, mounted inside of the vehicle interior compartment with a view through the front windshield, or even on a vertical mount from the vehicle roof. It is contemplated that the particular location of front-facing camera 18 would take into consideration the height and angle of the captures images from the perspective of the camera 18 or point of view (POV) as may be desired.

It is contemplated that trucks will have higher apparent elevations above a road surface than automobiles. The higher a POV, generally the more inclusive the view because it offers a more advantageous perspective with an ability to see further over rising or humped terrain contours. Conversely, an unusually high POV or an overly low POV can produce unnatural or undesirable effects, restricting surrounding views or causing them to differ from the immediate real world conditions. The positioning of the front-facing camera 18 would take into consideration vertical and lateral viewing angles which are the most appropriate for reproducing: (a) the vehicle or POV on which the "digital window" to be simulated, and; (b) the average driver eyepoint for the average observing vehicle, so that the viewed image on a moving vehicle (or on a stationary structure) appears consistent and relates as closely as possible to the visible environment, surroundings, terrain and immediate conditions forward of or opposite the obstruction.

The front-facing camera 18 may be configured to rotate, pan, tilt, move laterally, or to convey a laterally-moving visual field to the digital display 20. This means that when a vehicle pulls towards the center of a roadway to pass—or a vehicle's POV shifts as the vehicle moves past center on a stationary video display—that the imagery can be designed to shift slightly accordingly to extend the lateral viewing range and the reality for a given observer. This view may then quickly reset or fade back to its original average POV once a mobile vehicle and its observer passes.

Each application—whether moving or static—may differ as to selected optics, camera, display positioning and properties—however adequate technical options exist and are known to one of ordinary skill in the art to reproduce and optimize the most critical and demanding viewing angles and conditions for the purposes anticipated—that is to provide an immediate, realistic and reasonably accurate appraisal of conditions on the far side of an obstruction. Beyond this, the human eye and mind is able to adjust and interpret displayed imagery in terms of actual real world conditions and surroundings.

The system includes a wireless receiver 22 that is configured to receive an activation request signal "S" from the wireless transmitter 26 of a second vehicle 24. The wireless receiver 22 and the wireless transmitter 26 may be selected from those which are well known to one of ordinary skill in the art. In this regard the wireless receiver 22 and the wireless transmitter 26 may utilize various technologies such as radio frequency (RF) technology for generation and receipt of the activation request signal "S". Such technologies may include Connected Vehicle (CV) technologies using Dedicated Short Range Communications (DSRC), WiFi, GPS or other Vehicle to Vehicle (V2V) or Vehicle to Infrastructure (V2I) communications systems. Other technologies may include infrared, optical and even acoustic signals. It is contemplated that any of those wireless communications technologies may be utilized as discussed in U.S. patent application Ser. No. 12/293,277, published as Patent Application Publication No. US 2009/0299857 (the entire contents of which are incorporated herein by reference). It is contemplated that the wireless receiver 22 may receive optical or visual signals, such as detection of a flashing turn signal indicator lamp of the trailing vehicle 24. In such an embodiment, the wireless transmitter would be the t turn signal indicator lamp itself and the activation request signal would its flashing light.

As mentioned above the system includes the wireless receiver 22 affixed with the vehicle body 12. As used herein the term "affixed with" refers to being attached to, mounted or otherwise integrated with. In this regard, the receiver 22 may come pre-installed by the vehicle manufacturer or installed and attached as an after-market device. The wireless receiver 22 may be disposed at any location about the vehicle 10. For example, the wireless receiver 22 may be located at the vehicle rear end 16, such as integrated with a rear bumper, a trunk lid, a rear hatch, a rear door, a tailgate, a liftgate, about a rear window, or at the rear portion of a vehicle roof. It is contemplated that the particular location of wireless receiver 22 would take into consideration the type of technology utilized for generation and receipt of the activation request signal "S". In this regard, the wireless receiver 22 may not even be exposed at the exterior of the vehicle 10 and positioned internal to the vehicle 10, such as may be the case where certain radio frequency signals are utilized taking into consideration anticipated signal strength. In contrast, where infrared signals are utilized, line of sight may be required and the wireless receiver 22 may be required to be exposed.

The digital display 20 may be selected from any of those which are well known to one of ordinary skill in the art. In this regard, the digital display 20 may be based upon LED or OLED technology. It is contemplated that any of those display technologies and implementation techniques may be utilized as discussed in U.S. patent application Ser. No. 12/293,277, published as Patent Application Publication No. US 2009/0299857 (the entire contents of which are incorporated herein by reference). A video/signal processor 28 may be provided. The video/signal processor 28 may be used to facilitate the display of the captured digital images as may be processed by the image processor 36 at the digital display 20.

As mentioned above the system further includes the digital display 20 affixed with the vehicle body 12. As used herein the term "affixed with" refers to being attached to, mounted or otherwise integrated with. In this regard, the digital display 20 may come preinstalled by the vehicle manufacturer or installed and attached as an after-market device. The digital display 20 may be disposed at the vehicle rear end 16. The particular installation, dimensions and sizing would depend on the nature and type of vehicle. For example, the digital display 20 may be affixed with a portion of an automobile trunk lid or a rear door of a truck or a van, a liftgate of an SUV or minivan, a tailgate of a minivan, SUV or truck, etc. From an aesthetics point of view, it is desirable that the digital display 20 is integrated as flush as possible.

The digital display 20 may further include a lighted perimeter frame or marking so as to provide the viewer a visual indication that the displayed images are just that. This would help to mitigate possible viewer misinterpretation of what is being seen as the vehicle 10 could become "too" transparent.

The digital display system may further include a distance sensor 30 disposed at the vehicle rear end 16. The distance sensor 30 may be configured to sense distance data of an object behind the vehicle rear end 16 (such as the second vehicle 24). The digital display 20 is configured to display captured digital images from the front-facing camera 18 in response to receipt of sensed distance data from the distance sensor 30. In this regard, in addition to receipt of the activation request signal "S" associated the second vehicle 24, the sensed distance data may be utilize by the image processor 36 to preform scaling operations to account for the viewer distance of the second vehicle. The distance sensor 30 may be selected from any of those which are well known one of ordinary skill in the art, and may be based upon radar signals for example.

In accordance with another aspect of the present invention, there is provided method of displaying images upon a first vehicle, such as the first vehicle 10. The first vehicle 10 includes the vehicle body 12, the vehicle front end 14 and the vehicle rear end 16. The method includes capturing digital images from in front of the vehicle front end 14 by the front-facing camera 18 of the first vehicle 10. The method further includes receiving the activation request signal "S" from the wireless transmitter 26 of the second vehicle 24 by the wireless receiver 22 of the first vehicle 10. The method further includes displaying the captured digital images at the vehicle rear end 16 in response to receipt of the activation request signal "S".

The method may further include sensing with the distance sensor 30 disposed at the vehicle rear end 16 distance data of the second vehicle 24 behind the vehicle rear end 16. The digital display 20 may be configured to display captured digital images from the front-facing camera 18 in response to the sensed distance data. The method may further include determining proximity data of the second vehicle 24 to the first vehicle 10 based upon the received activation request signal "S". The digital display 20 may be configured to display captured digital images from the front-facing camera 18 in response to the determined proximity data. The method may further include scaling captured digital images prior to display at the digital display 20. The method may further include receiving a signal indicating activation of a turn signal indicator 66 from the wireless transmitter 26 of the second vehicle 24 by the wireless receiver 22 of the first vehicle 10. The method may further include determining a movement status of the first vehicle 10, and displaying the captured digital images at the vehicle rear end 16 using the determined movement status of the first vehicle 10.

The activation request signal "S" may be manually initiated. In this regard, such a control may be integrated with turn signal indicator 66 of a standard turn signal stalk or dedicated steering wheel controller, together with connections to electrical power and the wireless transmitter 26. A mobile device such as a smartphone with a mobile application or app could enable manually activate the digital window controls to result in display of the captured images upon the digital display 20. However, due to safety concerns, such a system should consider that only the driver of a following/viewing vehicle can control what is seen on vehicles ahead of him/her.

In practice, when a driver of a following vehicle, such as a driver 62 of the second vehicle 24, determines he/she wants to pass, or needs to see what is beyond or blocked by a digital windows-equipped vehicle (the first vehicle 10) ahead, the driver 62 may merely tap the digital windows see-through control on their steering wheel (or light tap or fully engage the turn signal indicator 66 via the stalk). This sends a wireless activation request signal "S" from the wireless transmitter 26 to the wireless receiver 22, where the activation request signal "S" is forwarded (together with any proximity, range, vehicle type, relative speeds or other information deemed relevant and appropriate to vehicle identification and passing) to a display processor 28, which then places the captured images generated by the forward-facing camera 18 onto digital display 20.

The process is intended to be near-instantaneous. After a predetermined evaluation time—after initiating a passing lane change—after manually cancelling the activation of the turn signal indicator 66—or after manually turning "off" the digital windows (or such other procedure during which the driver 62 of the second vehicle 24, decides whether or not to execute a pass, the see-through display system may be configured to automatically disengage and the captured digital images which were previously displayed on the digital display 20 (if any) are replaced. If a following driver 62 repeats the process, the display system again shows the captured digital images from the forward-facing camera 18 on the digital display 20. When the driver 62 of the second vehicle 24 pulls out to pass the first vehicle 10, the see-through window along with any cautionary perimeter lighting is turned "off" (the display system ceases to display the captured images in response to the activation request signal "S") and the system is reset to its normal driving condition.

Clearly there is no need to "see-through" a vehicle when it is at a distance—but rather only at times when one is following close and in a position to pass. Therefore it is likely that a means for controlling—and for not allowing under certain circumstances—digital see-through capabilities via manually or automatic operation—and that these be tested and implemented based on vehicle safety passing and driving criteria.

As a practical matter, any motor vehicle equipped with see-through technology should remain conventionally visible with lighting and safety systems operational at all times. When a second, trailing vehicle reaches a point behind a lead vehicle where it is appropriate to pass—where its closing speed drops off and approximately matches that of the lead vehicle—it would be appropriate, in one embodiment of the proposed invention, to automatically engage the see-through feature as a safety issue and courtesy—allowing the trailing vehicle to see through to the highway beyond—yet not be in any way demanding that a passing should take place. In the event a speeding vehicle closes very quickly, a digital window-equipped leading vehicle might first flash a precautionary warning (e.g., a color bar or similar visual alert, for example) and perhaps next open the see-through window, perhaps accompanied by the previously discussed perimeter lighted/color frame to indicate the clear boundaries of the window and the presence of the leading vehicle. This may be of vital importance for night driving where the displayed image of approaching headlights beyond the subject vehicle may be misread as reflections in rear glazing from headlamps approaching from the rear. To avoid the latter, angling the top edge of the digital display 20 (or its glazed surface) rearward, and inward at the bottom, or curving the glass into a convex shape top to bottom, will minimize, eliminate or condense such reflections.

Separately or in conjunction with the above, it may prove wise to also provide cars and drivers with a manual means for self-activating digital windows in vehicles ahead of them. One way to accomplish this would be to link the turn signal indicator 66 control of a following vehicle to a wireless transmission of the activation request signal "S" to the display system of a vehicle immediately ahead. This way driver "intent" could open the digital window. A following vehicle—upon engaging its passing turn signal—would send an activation request signal "S" to the forward vehicle activating its rear-facing digital display 20 and its perimeter marker, if any. This would also alert any other vehicles to the rear.

It is contemplated that software/algorithms may be utilized to identify the make, model, year and even the condition of a motor vehicle. With this information, for a following vehicle preparing to pass such software/algorithms can be used to assess a vehicle's capacity to pass (at various speeds, under various roads grades, conditions, etc.) and thus derive passing and safety assessments and corresponding alerts should they be necessary. Such alerts may be sent from the software for display on the digital display 20. Additionally, software/algorithm can be implemented to determine when a following vehicle is preparing to pass, is moving laterally or has moved clear into the adjacent (passing) lane—and can then use this data to automatically terminate the "digital window" so that it does not distract or mislead other following vehicles.

Figure 2:
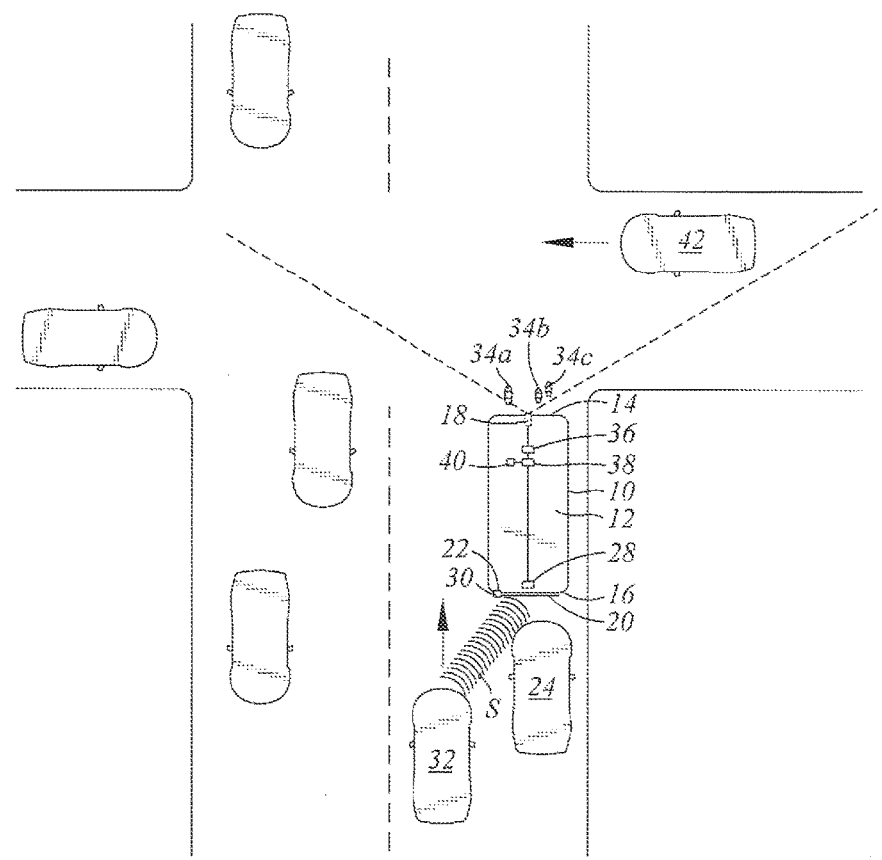
FIG. 2 is a top view of a symbolic street intersection with the first vehicle of FIG. 1 along with other vehicles.

Referring now to FIG. 2 there is depicted a top view of a symbolic street intersection with the first vehicle 10 of FIG. 1 along with other vehicles. In this example scenario, the first vehicle 10 is an obstructing vehicle with respect to a vehicle 32 attempting to pass along the right side of the first vehicle 10, as well as with respect to the following vehicle 24. It is contemplated that the display of captured images from the forward-facing camera 18 would reveal to the vehicles 24, 32 the presence of hidden pedestrians 34*a-c* and a hidden vehicle 42. In the case of a "green" light for the Northbound lane of vehicles 10, 24, 32, the display system would reveal the hidden vehicle 42 "running" a "red" light crossing right to left, and thereby creating a very dangerous traffic condition with regard to a potential accident between the vehicle 32 and the vehicle 42. The danger of potential accidents between the vehicle 32 and the pedestrians 34*a-c* could also be recognized by the driver of the vehicle 32. Moreover, the display of the captured images from in front of the vehicle 10 would give warning to the driver of the vehicle 24 that the vehicle 10 may abruptly stop or why it has stopped in light of the hidden cross traffic of the pedestrians 34*a-c* and the vehicle 42. The digital display system may include software/algorithms that anticipate such potential accidents and may super-impose or otherwise display alerts indicating as much.

The display system may further include a Connected Vehicle system in the form of the CV processor 38 and antenna 40. The Connected Vehicle system is selected and configured according to those systems and protocols which are known to one of ordinary skill in the art. The Connected Vehicle system is contemplated to wirelessly interact with a CV telematics network that alerts all CV-equipped vehicles in the vicinity of the potential hazard and sends out in-car dash alerts. Captured digital images from the forward-facing camera 18 may be evaluated at image processor 36 which compares incoming CV telemetry via antenna 40 at CV processor 38 confirming that the vehicle 42 is a potential traffic hazard. Other information from the CV telematics network may include information regarding emergency vehicles, such as with regard to the vehicle 42 that may be a police or ambulance vehicle.

Figure 3:
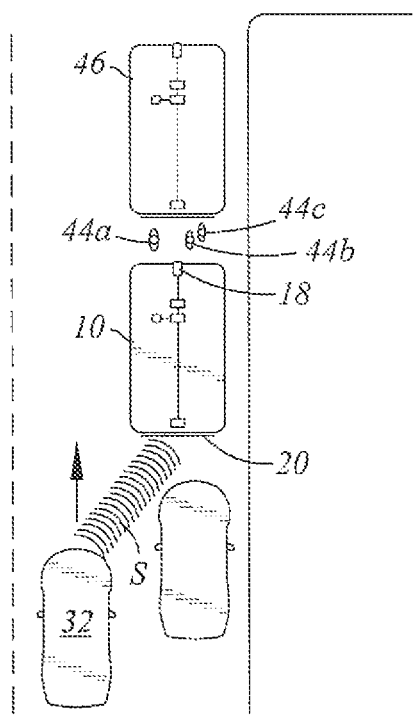
FIG. 3 is a top view of another symbolic street intersection with the first vehicle of FIG. 1 along with another similarly equipped vehicle, other vehicles and pedestrians.

Referring now to FIG. 3 there is depicted a top view of another symbolic street intersection with the vehicle 32 traveling North along a parked vehicle 10. Another along with another similarly equipped vehicle 46 is parked in front of vehicle 10. Children 44*a-c* are entering the street between the vehicles 10 and 46 and are hidden from the driver's view in vehicle 32 by the vehicle 10. In this situation, it is possible for the digital display system to display captured images of the hidden children upon the digital display 20 for viewing by the driver of the vehicle 32.

It is contemplated that the display system may be interfaced with other on-board systems included in the vehicles 10, 46, such as on-board parking/backing radar and forward-looking radar. Detection of movement, such as of the children 44*a-c*, may result in a triggering of data communications with the digital display system to allow for activation of the "digital window" in the form of the digital display 20. The presence of the children 44*a-c* may be sensed by the parking/backing radar of the vehicle 46 and optionally by forward-looking radar of the vehicle 10, and this movement between the parked vehicles 10, 46 triggers the digital window digital display of both vehicles. Thus at the rear of vehicle 46, a digital window digital display may be configured to display a brilliant bright color alert, while the digital display 20 of the vehicle 10 activates its forward-facing camera 18 to show a real time view of the children 44*a-c* silhouetted against the brightly-colored digital display of the vehicle 46.

Connected Vehicle/DSRC systems can be used to monitor and highlight moving or parked cars and trucks—and more importantly the spaces between them. If for example, children, pets or inattentive adults wonder into the street perhaps unseen by approaching motorists—or if a vehicle is backing from a driveway across a sidewalk/into the street—then such systems, together with new car proximity radars can detect such intrusions and instantly queue the appropriate alert message on the digital windows display. For example, if a child were to enter the street between parked cars where street traffic is closing—and the parked cars are equipped with see-through digital windows, then the most distant car (forward of the child) could flash a brilliant color panel (alerting both the kids to oncoming traffic and alerting the approaching driver of the concealed kids—at the same time the closest parked car could engage its forward-looking camera revealing the moving child against the flashing backdrop, all framed by its brightly-colored perimeter frame. The presence of movement between parked cars (kids, adults, pets, etc.) can be detected by today's backing radar systems and their output used to trigger digital window displays. Such alerts are far superior to today's anticipated CV instrument panel red-light alert because they directly link the emergency alert with the source or location of the problem or issue. Non-specific or general use flashing red lights or LED bars on a vehicle's IP is non-specific as to the type or precise location of a potential threat or collision resulting in a two-stage driver response: first to associate the red light on the dash with an emergency, and second to locate the cause or source of that emergency in one's field of view or in the real world. Digital windows of the display system, on the other hand, immediately reveal the source or approximate visual location of an event even when the actual cause (the child) may still be beyond view.

According to another aspect of the present invention, there is provided a method of viewing digital images upon a first vehicle, such as the first vehicle 10. The first vehicle 10 has the vehicle front end 14 and the vehicle rear end 16. The method includes activating the turn signal indicator 66 at the second vehicle 24. The method further includes transmitting the activation request signal "S" from the wireless transmitter 26 of the second vehicle 24 to the wireless receiver 22 of the first vehicle 10. The method further includes viewing displayed digital images at the vehicle rear end 16 of captured digital images from in front of the vehicle front end 14 in response to the activation request signal "S". The method of viewing may further include transmitting a signal indicating activation of the turn signal indicator 66 from the wireless transmitter 26 of the second vehicle 24 to the wireless receiver 22 of the first vehicle 10.

According to yet another aspect of the present invention, there is provided a digital display system for use with a first object. For example, the first object may be the first vehicle 10. The first object includes an object first side and an object second side. In the case of the first vehicle 10, the first side may be the vehicle front end 14 and the second side may be the vehicle rear end 16. The system includes a camera configured to capture digital images from adjacent the object first side. In the case of the first vehicle 10, the front-facing camera 18 is configured to capture digital images from adjacent the vehicle front end 14. The system further includes a wireless receiver (such as the wireless receiver 22 of the first vehicle 10) configured to receive an activation request signal from a wireless transmitter of a second object (such as the activation request signal "S" of the second vehicle 24). The method further includes a digital display disposed at the object second side, such as the digital display 20. The digital display 20 is configured to display captured digital images from the camera in response to receipt of an activation request signal by the wireless receiver.

Figure 4:
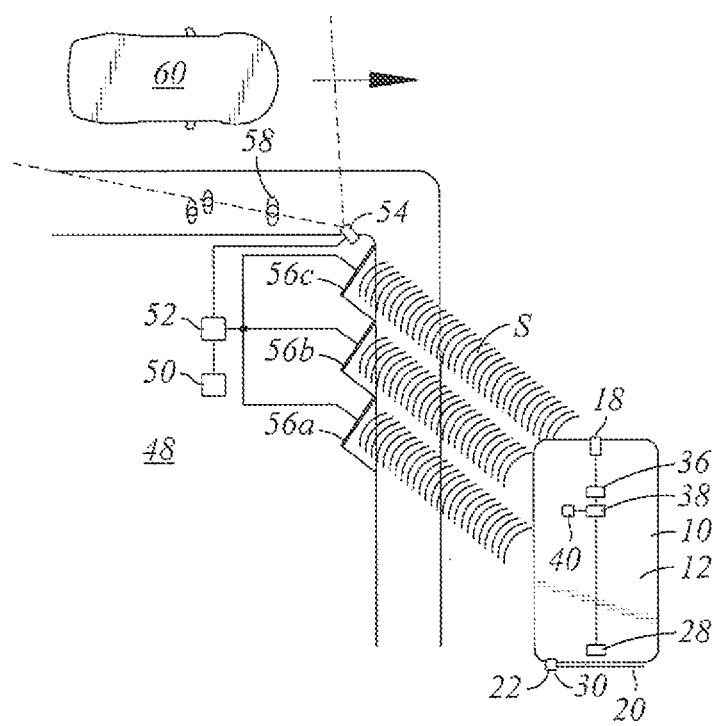
FIG. 4 is a top view of another symbolic street intersection with the first vehicle of FIG. 1 and a structure with a digital display system in accordance with another aspect of the present invention along with another vehicle and pedestrians.

According to various other embodiments, the first object need not be a vehicle. The first object may be a fixed structure. Turning now to FIG. 4, the first object may be a fixed structure, as symbolically indicated as a portion of building 48. The second object may be a mobile object, such as the vehicle 10. The vehicle 10 may include a wireless transmitter which may be integrated with the wireless receiver 22 for generating an activation request signal "S". In this example, the building 48 may include a camera 54 located along a first side (such as a wall) and digital display in the form of three digital displays, 56*a-c*, disposed along another side, such as an adjoining wall. The camera 54 may be connected to an image processor 52. A wireless receiver 50 is provided in communication with the image processor 52 and the digital displays 56*a-c*. The digital displays 54*a-c* are configured to display captured digital images from the camera 54 in response to receipt of the activation request signal "S" by the wireless receiver 50. In this regard, use of the digital display 54*a-c* to display the captured digital images may be used to significantly eliminate the "blind spot" created by the building 48. As can be appreciated, the digital display may be implemented on other types of fixed structures, such as signage, kiosks, temporary construction structures, and any other objects that create a "blind spot" or obstruction.

In another embodiment, the second object may be a mobile device. For example, the vehicle 24 may include a driver 62 having a mobile device 64, such as a smart phone. The mobile device 64 may be equipped with a wireless transmitter capable of generating an activation request signal. This may be particularly useful where the vehicle does not have such a capability, such as a person riding a bicycle.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A digital display system for use with a first vehicle, the first vehicle including a vehicle body, a vehicle front end and a vehicle rear end, the system comprising:
   a front-facing camera coupled to the first vehicle, the front-facing camera configured to capture a video stream of digital images from in front of the first vehicle;
   a detection component configured to identify an activation signal; and
   a digital display disposed at the rear end of the first vehicle such that the digital display can be viewed by a driver of a second vehicle that is behind the first vehicle, the digital display configured to display the captured video stream from the front-facing camera in response to identification of the activation signal by the detection component, wherein display of the captured video stream provides a substantially real-time view of objects in front of the first vehicle to the driver of the second vehicle.

2. The system of claim 1, wherein the activation signal is transmitted from the second vehicle.

3. The system of claim 1, wherein the activation signal is generated in response to a distance of the second vehicle moving within a predetermined threshold range from the first vehicle.

4. The system of claim 1, wherein prior to identification of the activation signal, the display screen does not display digital images from in front of the vehicle front end.

5. The system of claim 1, wherein prior to receipt of the activation request signal from the wireless transmitter of the second vehicle, the display screen does not display any digital images.

6. The system of claim 1, wherein the activation signal is based at least partly on a detected activation of a turn signal on the second vehicle.

7. The system of claim 1, further comprising: a processor configured to incorporate one or more filters or video effects to the captured video stream prior to transmitting and displaying on the digital display.

8. The system of claim 7, wherein the one or more filters or video effects are based at least in part on the surrounding daylight or field of view.

9. The system of claim 1, wherein the front-facing camera is coupled to the first vehicle at the vehicle front end including a front grill, a bumper, a headlamp unit, or a hood.

10. The system of claim 1, wherein the front-facing camera is coupled to the first vehicle at a front windshield, in a front portion of a vehicle roof, mounted inside of the vehicle interior compartment with a view through the front windshield, or on a vertical mount from the vehicle roof.

11. A method of capturing and presenting a video stream of digital images, the method comprising:

capturing, via a front-facing camera, a video stream of digital images from in front of a first vehicle;

storing the captured video stream;

detecting an activation signal; and in response to identification of the activation signal, presenting the captured video stream on a digital display disposed at the rear end of the first vehicle such that the digital display can be viewed by a driver of a second vehicle that is behind the first vehicle, wherein the display of the captured video stream provides a substantially real-time view of objects in front of the first vehicle to the driver of the second vehicle.

12. The method of claim 11, wherein the activation signal is transmitted from the second vehicle.

13. The method of claim 11, wherein prior to detection of the activation signal, the digital display does not display digital images from in front of the vehicle front end.

14. The method of claim 11, wherein prior to receipt of the activation signal from the wireless transmitter of the second vehicle, the digital display does not display any digital images.

15. The method of claim 11, wherein the activation signal is based at least partly on a detected activation of a turn signal on the second vehicle.

16. The method of claim 11, further comprising:

incorporating one or more filters or video effects to the captured video stream prior to transmitting and displaying on the digital display.

17. The method of claim 11, wherein the front-facing camera is coupled to the first vehicle at the vehicle front end including a front grill, a bumper, a headlamp unit, or a hood.

18. The method of claim 11, wherein the front-facing camera is coupled to the first vehicle at a front windshield, in a front portion of a vehicle roof, mounted inside of a vehicle interior compartment with a view through the front windshield, or on a vertical mount from the vehicle roof.

19. A non-transitory computer-readable storage medium storing computer executable instructions that, when executed by one or more computing devices, configure the one or more computing devices to perform operations comprising:

capturing, via a front-facing camera, a video stream of digital images from in front of a first vehicle;

storing the captured video stream;

detecting an activation signal; and in response to identification of the activation signal, presenting the captured video stream on a digital display disposed at the rear end of the first vehicle such that the digital display can be viewed by a driver of a second vehicle that is behind the first vehicle, wherein the display of the captured video stream provides a substantially real-time view of objects in front of the first vehicle to the driver of the second vehicle.

20. The non-transitory computer-readable storage medium of claim 19, wherein the activation signal is based at least partly on a detected activation of a turn signal on the second vehicle.

* * * * *